United States Patent
Feinleib et al.

[11] 3,904,274
[45] Sept. 9, 1975

[54] MONOLITHIC PIEZOELECTRIC WAVEFRONT PHASE MODULATOR

[75] Inventors: Julius Feinleib, Cambridge; Stephen G. Lipson, Belmont, both of Mass.

[73] Assignee: Itek Corporation, Lexington, Mass.

[22] Filed: Aug. 27, 1973

[21] Appl. No.: 392,163

[52] U.S. Cl. ............... 350/161; 310/9.8; 313/508; 332/26; 350/285; 350/295
[51] Int. Cl. .............................................. G02f 1/34
[58] Field of Search........ 350/160 R, 161, 285, 295; 332/26; 340/173.2; 313/508; 310/8.9, 9.8, 9.1

[56] References Cited
UNITED STATES PATENTS

| | | | |
|---|---|---|---|
| 3,376,092 | 4/1968 | Kushner et al. | 350/285 |
| 3,480,348 | 11/1969 | Preston | 350/161 |
| 3,742,234 | 6/1973 | Laakmann | 350/295 X |
| 3,746,785 | 7/1973 | Goodrich | 350/161 X |
| 3,796,480 | 3/1974 | Preston et al. | 350/161 |

*Primary Examiner*—Alfred L. Brody
*Attorney, Agent, or Firm*—Homer O. Blair; Robert L. Nathans; David E. Brook

[57] ABSTRACT

A wavefront phase modulator is disclosed which is formed from a monolithic piezoelectric medium which undergoes dimensional changes in response to an electric field impressed thereacross. A thin metallized sheet is cemented to one surface of the piezoelectric medium to provide a mirror surface. Means are provided to produce a plurality of discretely electrically addressable locations on the piezoelectric medium. Such means include a series of segmented electrodes and/or saw cuts or drilled holes. Means are also provided for addressing each of the discrete locations with a variable strength voltage in order to cause the piezoelectric medium to undergo controlled and continuous surface deformations. These surface deformations are calculated to provide distortion correction for wavefronts reflected from the mirror surface of the modulator.

8 Claims, 4 Drawing Figures

PATENTED SEP 9 1975　　　3,904,274

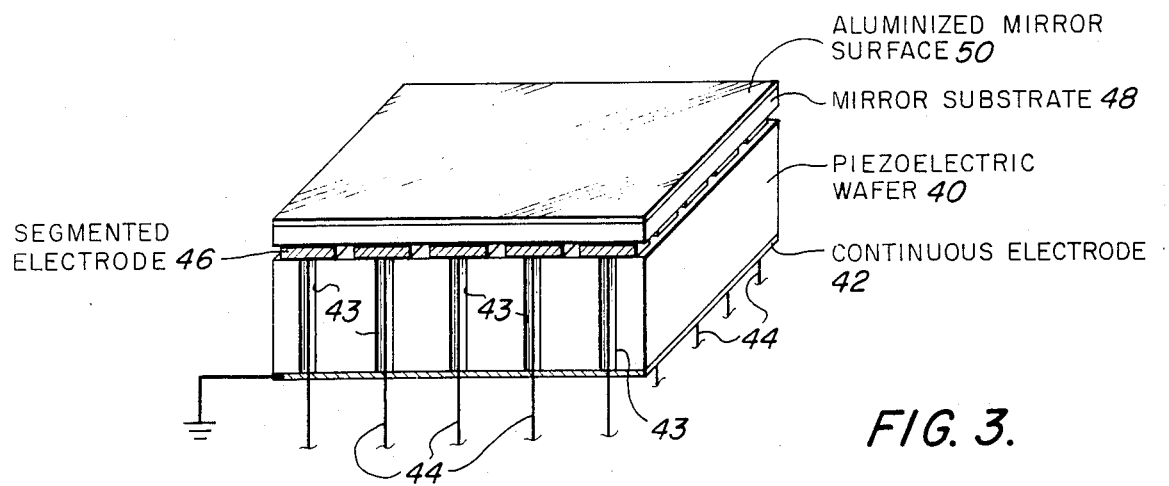
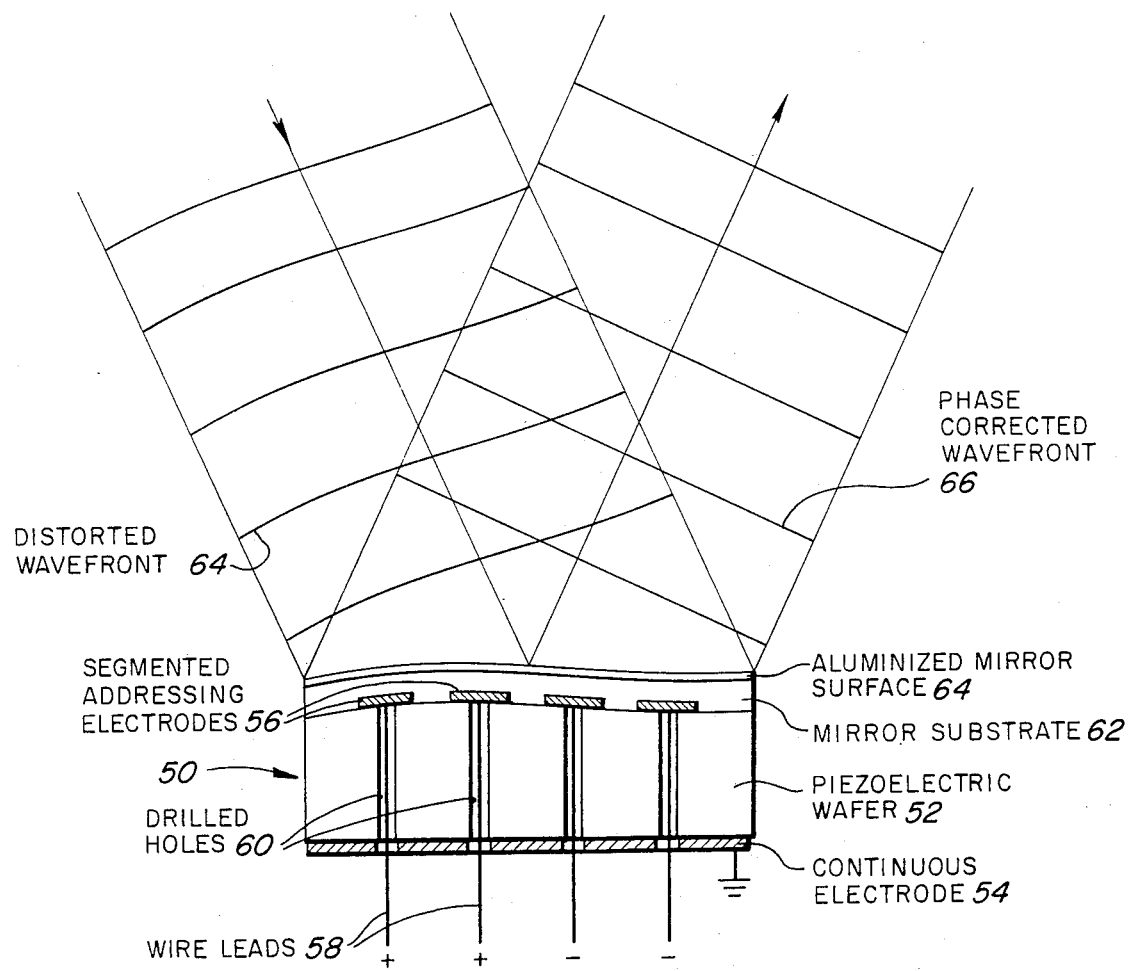

MONOLITHIC PIEZOELECTRIC WAVEFRONT PHASE MODULATOR

BACKGROUND OF THE INVENTION

1. Field of the Invention

This invention is in the field of wavefront phase modulators and more particularly in the field of wavefront phase modulators formed from monolithic piezoelectric media.

2. Description of the Prior Art

Optical wavefronts often become distorted in passing through certain media. An example of such distortion occurs when images of astronomical bodies pass long distances through space and finally through the atmosphere surrounding the earth before being perceived. Distortion occurs due to wind, thermal gradients, etc. To obtain high resolution of such images, it is necessary to remove this distortion and to view an aberration free image.

Wavefront phase modulators, in general, are known in the prior art. Most of these operate by pushing and pulling deformable mirrors having a large number of discrete mirror elements. The drivers for such elements can be electromechanical, piezoelectric, etc. It has not been known, however, to use one piezoelectric element multiply addressed to form a monolithic phase corrector.

SUMMARY OF AN EMBODIMENT OF THE INVENTION

In one embodiment, this invention relates to a wavefront phase modulator which is formed from a monolithic piezoelectric medium. A mirror surface is provided on one side of the piezoelectric medium. Means for providing the piezoelectric medium with a plurality of discretely electrically addressable locations are used together with means for addressing each of these discrete locations. The amount of electrical voltage applied at each addressable location is that required to make an appropriate correction in a distorted wavefront directed to the mirror surface of said piezoelectric medium.

In one embodiment, the means for providing a plurality of discretely electrically addressable locations comprises a continuous electrode on one side of the medium and a series of segmented electrodes on the other side. In other embodiments, saw cuts or drilled holes are added in addition to or in place of the segmented electrodes to provide independent movement capability for each addressable location.

The piezoelectric wavefront phase modulator can be used to remove distortion from optical images which have passed through the atmosphere. Although atmospheric phase correction is an important use, there are additional uses. These include the correction of gravitational distortions of optical elements, encoding wavefronts by introducing a known distortion to the wavefront, correction of wavefronts of laser beams, image processing and wavefront correction, etc.

The monolithic construction of the modulator provides significant advantages over wavefront phase correctors previously known. The devices as described herein are simply fabricated, can have a large number of addressable points, are inherently stable, and are compact. Additionally, they have uniformity of the piezoelectric coefficient from point to point since the material is one wafer. These piezoelectric modulators also have extremely rapid response times compared to non-piezoelectric modulators. Most importantly, these modulators are capable of producing smooth continuous patterns with only a relatively small number of addressing points; these continuous surface deformations are outstanding for optical wavefront phase modulation or correction.

BRIEF DESCRIPTION OF THE DRAWINGS

FIG. 3 is a schematic illustration, in partial cross-section, of a third and preferable embodiment of a piezoelectric wavefront modulator as described herein; and, FIG. 4 is a schematic illustration of the operation of the modulators as described herein.

DESCRIPTION OF PREFERRED EMBODIMENTS

Figure 1:
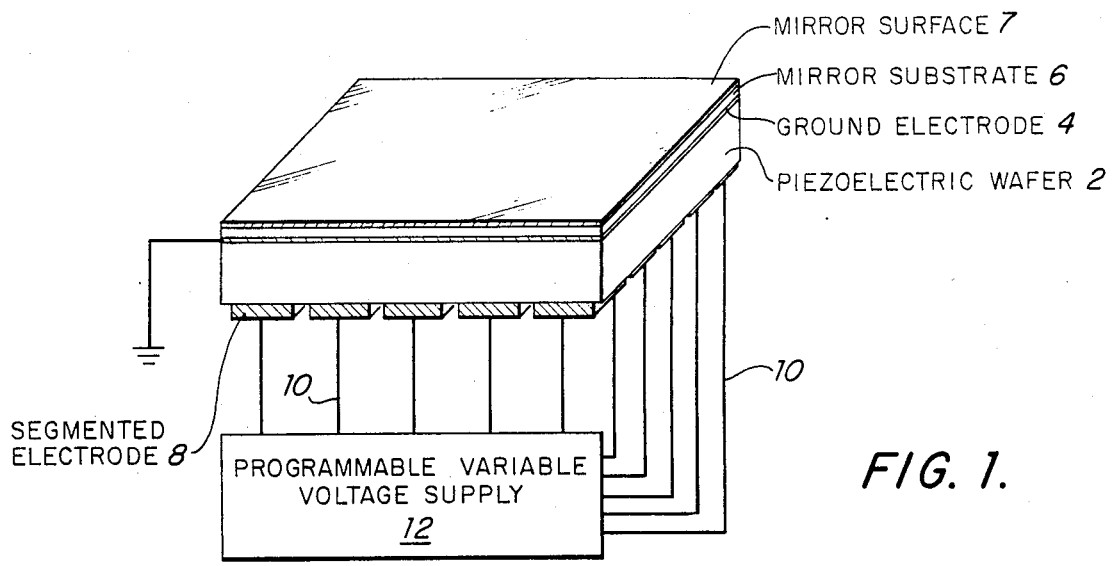
FIG. 1 is a schematic illustration of a piezoelectric wavefront phase modulator as described herein.

Referring now to the Figures in more detail, FIG. 1 illustrates in schematic fashion a piezoelectric wavefront phase modulator of this invention. Piezoelectric layer 2, which can be barium titanate, a lead zirconium titanate based ceramic, or single crystal materials such as bismuth germanium oxide or quartz, is ground flat on both sides. On one side, a continuous ground electrode 4 is deposited; ground electrode 4 can be formed from silver paste, copper, gold, aluminum, etc. Conducting silver glass is preferred with ceramic piezoelectrics because of the excellent match in thermal coefficients of expansion which is then possible. A thin mirror substrate 6 is joined to the top surface of ground electrode 4, and substrate 6 is polished flat and aluminized to provide mirror surface 7.

On the opposite surface of piezoelectric material 2, segmented electrodes 8 are deposited. The size, shape and spacing of electrodes 8 are designed to optimize the desired phase correction by providing the number of discrete addressable locations required. Electrical leads 10 are attached to electrodes 8 and are used to electrically connect the individual electrodes to a programmable, variable voltage supply 12. The input to voltage supply 12 can be furnished, for example, from a wavefront sensor system such as interferometric sensing system.

A typical set of dimensions for a modulator of FIG. 1 having 25 discrete addressable locations is as follows. The piezoelectric wafer can be square in shape and 1.5 inches on each side and 0.10 inches thick. The mirror substrate can be 0.01 inches thick, and the aluminum surface should be uniform. Each segmented electrode can be 0.2 inches from the center of adjacent electrodes.

The modulator illustrated in FIG. 1 utilizes a single piezoelectric layer. It requires no discontinuities, holes or cuts in the material.

Figure 2:
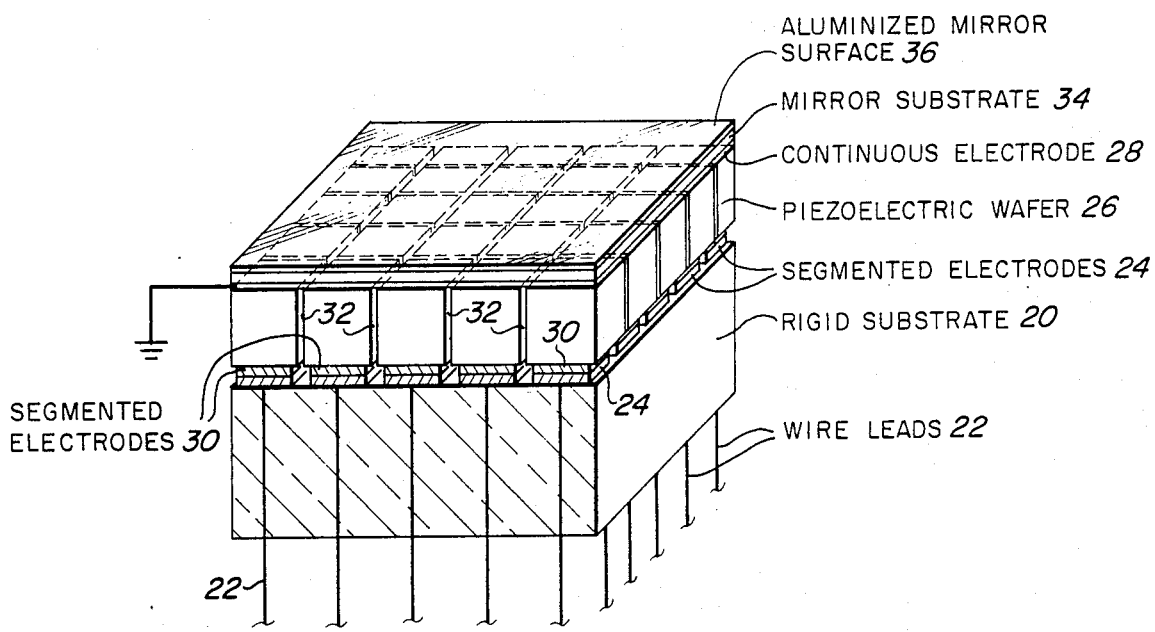
FIG. 2 is a schematic illustration of a different embodiment of a piezoelectric wavefront phase modulator as described herein.

In FIG. 2, an alternate embodiment of a piezoelectric phase modulator is illustrated which is similar to that shown in FIG. 1 except that the piezoelectric material is diced between electrodes. This alternative embodiment can be fabricated as follows.

Rigid substrate 20, which can be glass or other rigid material, has wire leads 22 extending therethrough in a pattern corresponding to the desired electrode pattern. The upper surface of rigid substrate 20 has a pattern of segmented electrodes 24 deposited thereon. Solid piezoelectric wafer 26 is ground flat on both surfaces. A continuous electrode 28 is deposited on one surface of layer 26, and segmented electrodes 30 are deposited on the other side in a pattern exactly corresponding to segmented electrodes 24. The segmented electrodes 24 and 30 are then joined in electrical contact with each other.

Thin saw cuts 32 are made through piezoelectric wafer 26. These can extend entirely through wafer 26, and through continuous electrode 28, or can extend only partially through wafer 26. The purpose of saw cuts 32 is to divide wafer 26 into individually responsive elements.

Lastly, a mirror substrate 34 is joined to the upper electrode 28, and the surface 36 is polished and aluminized. A metallized undersurface (not shown) can be provided on mirror substrate 34 to connect the upper electrodes of the piezoelectric element together, if the saw cuts extend through the continuous electrode 28, and either this metallized undersurface of electrode 28 can be connected to ground.

Typically, a modulator having the construction of FIG. 2 and 25 addressable points could have dimensions as follows. A piezoelectric wafer 1.5 inches square and 0.25 inches thick can be used. The glass substrate could be 0.5 inches thick with the wire leads positioned 0.2 inches apart. The saw cuts are approximately 0.02 inches thick.

The piezoelectric deformation for a given applied voltage is relatively easy to calculate for the embodiment illustrated in FIG. 2. Additionally, this embodiment has more response for a given applied voltage than the embodiment of FIG. 1.

FIG. 3 illustrates the preferred embodiment of a piezoelectric wavefront phase modulator as described herein. A piezoelectric wafer 40 is ground flat on both sides. Continuous electrode 42 is deposited on the lower surface of piezoelectric material 40 and connected to ground. Holes 43 are drilled through piezoelectric wafer 40 corresponding to the desired addressable locations. Lead wires 44 extend through holes 43 and are electrically connected to segmented electrodes 46 deposited on the upper surface of piezoelectric material 40. A mirror substrate 48 is joined to the top of piezoelectric material 40, and its surface 49 is polished and aluminized. Assuming this phase modulator to have 25 addressable locations, typical dimensions might be as follows. The piezoelectric wafer can be 1.5 inches square and 0.5 inches thick. The drilled holes can be 0.025 inches in diameter and located 0.2 inches from each other. The mirror substrate can be 0.03 inches thick. The segmented electrodes might be circles having a diameter of 0.1 inches.

The embodiment illustrated in FIG. 3 does not require a rigid substrate since the deformation occurs almost entirely at the upper surface. It also has the highest sensitivity, i.e., largest deformation for a given applied voltage of the three embodiments illustrated. Additionally, its mechanical rigidity is outstanding since very small holes are used.

The most important advantage of this embodiment is that it gives a very smooth continuous wavefront correction. These corrections correspond uniquely to a set of voltages applied to the addressing points, and calculation of this correspondence is very simple.

FIG. 4 illustrates schematically the operation of a piezoelectric wavefront phase modulator of this invention. The modulator 50 is fabricated from a monolithic piezoelectric wafer 52 having a continuous electrode 54 at its bottom surface and addressing segmented electrodes 56 at its upper surface. Electrical leads 58 extend through drilled holes 60 and connect with segmented addressing electrodes 56. The upper surface has a mirror substrate 62 and a mirror surface 64.

A distorted wavefront 64 is shown approaching the modulator. To compensate for the wavefront distortion, a variable set of voltages are applied to the electrodes of modulator 50 to cause piezoelectric wafer 52 to deform in a pattern which will exactly correct distorted wavefront 64. Thus, phase corrected wavefront 66 is reflected away from the device with distortion previously therein removed.

What is claimed is:

1. A piezoelectric wavefront modulator, comprising:
   a. a monolithic piezoelectric medium which undergoes dimensional changes in response to an electric field impressed thereacross, said piezoelectric medium having a mirror surface on one side thereof;
   b. means for providing said piezoelectric medium with a plurality of discretely electrically addressable locations; and,
   c. means for addressing each discretely electrically addressable location with a variable strength voltage, said field being sufficient at each location to cause the piezoelectric medium to undergo continuous surface deformation which is capable of correcting distortion in a wavefront striking said mirror surface of the piezoelectric medium.

2. A modulator of claim 1 wherein said means for providing said piezoelectric medium with a plurality of discretely electrically addressable locations comprises a segmented electrode on one surface of said piezoelectric medium and a continuous electrode on the other side, each of said segmented electrodes being connected to a variable voltage supply.

3. A modulator of claim 2 additionally including saw cuts in said piezoelectric medium.

4. A modulator of claim 1 wherein said means for providing said piezoelectric medium with a plurality of discretely electrically addressable locations comprises a continuous electrode on one side of said piezoelectric medium and a series of segmented electrodes on the other side thereof, and a series of holes extending through said piezoelectric medium, said means for addressing includes a variable voltage source, and each of said holes contains a wire extending from said variable voltage source to one of said segmented electrodes.

5. A modulator of claim 4 wherein said piezoelectric medium comprises barium titanate.

6. A modulator of claim 4 wherein said piezoelectric medium comprises a lead zirconium titanate based ceramic.

7. A modulator of claim 4 wherein said piezoelectric medium comprises a single crystal of bismuth germanium oxide.

8. A modulator of claim 4 wherein said piezoelectric medium comprises a single crystal of quartz.

* * * * *